(12) United States Patent
Moncomble et al.

(10) Patent No.: US 9,118,798 B2
(45) Date of Patent: Aug. 25, 2015

(54) METHOD FOR PROCESSING A MULTIMEDIA STREAM, CORRESPONDING COMMUNICATIONS TERMINAL, SERVER AND COMPUTER PROGRAM PRODUCT

(71) Applicant: Orange, Paris (FR)

(72) Inventors: Ghislain Moncomble, Plestin-les-Grèves (FR); Arnaud Brun, Boulogne Billancourt (FR); Cedric Floury, Perros Guirec (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 13/973,494

(22) Filed: Aug. 22, 2013

(65) Prior Publication Data

US 2014/0055677 A1 Feb. 27, 2014

(30) Foreign Application Priority Data

Aug. 23, 2012 (FR) ...................................... 12 57965

(51) Int. Cl.
*H04N 7/08* (2006.01)
*H04N 21/218* (2011.01)
*H04N 21/2343* (2011.01)
*H04N 21/2665* (2011.01)
*H04N 21/2743* (2011.01)
*H04N 21/414* (2011.01)
*H04N 21/4223* (2011.01)
*H04N 21/845* (2011.01)

(52) U.S. Cl.
CPC ........... *H04N 7/08* (2013.01); *H04N 21/21805* (2013.01); *H04N 21/23439* (2013.01); *H04N 21/2665* (2013.01); *H04N 21/2743* (2013.01); *H04N 21/41407* (2013.01); *H04N 21/4223* (2013.01); *H04N 21/8456* (2013.01)

(58) Field of Classification Search
USPC ...................... 710/62–65; 709/203, 231, 206; 348/14.07
See application file for complete search history.

(56) References Cited

U.S. PATENT DOCUMENTS

| 8,196,168 | B1 | 6/2012 | Bryan et al. | |
|---|---|---|---|---|
| 8,537,195 | B2 * | 9/2013 | Duckworth et al. | 348/14.07 |
| 8,570,361 | B2 * | 10/2013 | Hsiao et al. | 348/46 |
| 8,682,812 | B1 * | 3/2014 | Ranjan | 706/12 |
| 8,837,600 | B2 * | 9/2014 | Sullivan | 375/240.25 |
| 2003/0093790 | A1 | 5/2003 | Logan et al. | |
| 2006/0130121 | A1 | 6/2006 | Candelore et al. | |
| 2010/0146055 | A1 * | 6/2010 | Hannuksela | 709/206 |
| 2011/0130087 | A1 | 6/2011 | Cilli et al. | |
| 2011/0307924 | A1 | 12/2011 | Roberts et al. | |
| 2012/0042091 | A1 | 2/2012 | McCarthy et al. | |
| 2012/0154513 | A1 * | 6/2012 | Su | 348/14.07 |

FOREIGN PATENT DOCUMENTS

| EP | 1845727 A2 | 1/2007 |
|---|---|---|
| WO | 0110127 A1 | 2/2001 |
| WO | 2011009101 A1 | 1/2011 |

* cited by examiner

*Primary Examiner* — Tammara Peyton
(74) *Attorney, Agent, or Firm* — David D. Brush; Westman, Champlin & Koehler, P.A.

(57) ABSTRACT

A method is provided for processing at least one multimedia stream pertaining to a real event, which is being acquired or has been acquired by a communications terminal. The method includes sub-dividing the stream into a plurality of consecutive sequences, on the basis of at least one distribution characteristic associated with each of said sequences. The step of sub-dividing is activated by distribution of the first stream by the communications terminal.

12 Claims, 6 Drawing Sheets

METHOD FOR PROCESSING A MULTIMEDIA STREAM, CORRESPONDING COMMUNICATIONS TERMINAL, SERVER AND COMPUTER PROGRAM PRODUCT

1. FIELD OF THE INVENTION

The present invention generally pertains to the field of telecommunications, and especially to the field of video.

More specifically, the invention pertains to the processing of multimedia or video streams acquired by a private party from a mobile terminal and especially to video streams pertaining to real events, in particular streams picking up or capturing large scenes such as concerts, lectures and other news events for example.

2. PRIOR ART

With the increasingly widespread use of mobile terminals provided with means for recording and broadcasting or distributing multimedia streams, numerous mobile terminal users like to personally film the events that they witness in order to share them with their friends and family, for example by distributing an event live through a mobile network.

However, the user of a simple mobile terminal is limited to a single viewpoint and often cannot follow the event optimally. Indeed, he or she is often at a distance from the main scene, and amidst a crowd, and this generally causes much sonic and visual disturbance.

Moreover, it is not possible for a user immersed in a crowd to make an on-the-fly choice of the appropriate angle of view, as would be done by a professional operator using a video mixing console (through which he could select an appropriate angle of view from a plurality of cameras) if only because of the limited size of the mobile terminals.

The present patent application is therefore aimed at enabling a user who does not possess any high-performance video equipment or special technical competence in the video field to produce a high-quality video stream either for his own use or for the benefit of a third party or third parties.

3. SUMMARY OF THE INVENTION

The invention proposes a novel solution that does not have all these drawbacks of the prior art. Indeed, the invention pertains to a method for processing at least one multimedia stream pertaining to a real event, that is being acquired or has been acquired by a communications terminal, comprising the following step:

sub-dividing said stream into a plurality of consecutive sequences, on the basis of at least one distribution characteristic associated with each of said sequences, said sub-dividing being activated by the distribution of said first stream by said communications terminal.

Thus, the invention makes it possible to sub-divide a stream being acquired or already acquired by a terminal, into sequences having different distribution characteristics, especially for the user of the terminal, so as to be able to then process them differently from one another at the time of the distribution.

In particular, the invention enables the definition, in association with each of the sequences, of a characteristic determining, for example, a restriction of distribution of the sequence, and especially a restriction that must subsequently be made of the use of the sequence. Thus, certain sequences can be characterized as being, for example, intended solely for use in a private context of the user of the terminal having acquired the stream, or on the contrary intended for wider distribution, for example among non-identified third parties.

Depending on the embodiments of the invention, the method for processing can be implemented in the communications terminal, for example by a dedicated application, or from a remote processing server, at reception of the stream distributed by the terminal According to one particular embodiment of the invention, said distribution characteristic associated with a sequence is defined on the basis of pieces of information belonging to the group comprising:

a shooting parameter;

a parameter of confidentiality depending on a recognition of objects in the sequence;

a geolocation of said terminal and/or a place of occurrence of said event;

an order of association of an operator.

Thus, in certain embodiments, the method of the invention is used to automatically define the distribution characteristic of a sequence, in taking account of the context of capture or picking up of the video sequence, for example the nature (front-vision camera or rear-vision camera, etc.) of the means of acquisition, the quality of the capture (the sensors of the capture means could have different resolutions), the position, orientation and/or angle of view of the capture means, or of the content of the video sequence (detection and/or recognition of face or of predetermined elements), for example.

The information listed here above is not exhaustive. Thus, in certain embodiments, said distribution characteristic associated with the sequence can be defined from pieces of information other than those listed here above.

In other embodiments, which may be complementary embodiments, the definition of the distribution characteristic associated with the sequence can be done manually by the user, for example so as not to restrict the distribution of certain parts of the sequence, comprising significant persons linked to the event, to a private context.

According to one particular characteristic of the invention, the method for processing further comprises a preliminary step for identifying said event delivering a piece of information for identifying said event comprising at least one temporal and geographical demarcation of said event.

Thus, the invention enables a temporal as well as geographical perimeter to be associated with a given event so as to enable proximate events to be distinguished from each other temporally or geographically (as in the case for example of two concerts at the same time in a festival or two successive events at the same place).

According to one particular characteristic of the invention, the method for processing comprises a preliminary step for taking account of a registration of said terminal.

Thus, the invention offers the user of a stream-acquiring terminal the advantage of being able to choose whether or not he wishes to benefit from an optimization of the stream already acquired or being acquired, for a specific event, or generally for any event that can benefit from this optimization. Thus, certain embodiments, where the registration of the terminal is not limited to an event, enable an optimization of the stream for the user for a certain number of events, necessitating simply a validation/confirmation by the user of the implementation of the method for processing according to the invention, without preliminary registration specific to the event in question.

According to one particular characteristic of the invention, said registration of said terminal comprises at least one piece of information for identifying an event.

Such embodiments, where the registration of the terminal relates to the event, enable the user to obtain an optimization of the stream acquired by his terminal solely on request, thus reducing the associated financial costs and using the method for processing the invention only when he deems such optimization to be desirable (for example in relation to the importance that he attaches to the event).

According to one particular characteristic of the invention, the method for processing comprises a step of temporal synchronization of said stream with a reference time base.

It can especially be a synchronization of the acquisition terminal performed during the registration of the terminal or a synchronization of each of the media streams received by the processing server, prior to the replacing step.

According to one particular characteristic of the invention, suited especially to implementing the invention on a processing server, the method for processing further comprises a step of replacement, in said first stream, of at least one part of a first sequence associated with a predetermined distribution characteristic by at least one part of a second sequence, identified from at least one distribution characteristic, of at least one second multimedia stream pertaining to said event, said second stream being distinct from said first stream, said part of said second sequence being of a same time frame as said part of said first sequence, said second part being selected depending on said predetermined distribution characteristic associated with said first sequence, generating an optimized multimedia stream.

Thus, the method of the invention enables the server to generate an optimized stream of an event from a stream that has been acquired or is being acquired from a terminal, the optimizing being done in taking account of the distribution characteristics of the sequences of the stream. For example, the only parts that will be replaced are parts of certain sequences having a predetermined distribution characteristic, for example the sequences called sequences of a public nature. The invention especially offers the advantage of systematically preserving certain sequences, associated with a particular distribution characteristic, such as a sequences pertaining to a private context.

Furthermore, according to the invention, the replacement sequences coming from the second stream are also selected according to the predetermined distribution characteristic. According to one embodiment, this may be a replacement by a part of a sequence having a distribution characteristic identical to that of the acquired sequence (for example so as to replace only sequences likely to be widely distributed, called sequences of a public nature, and so as not to introduce, into the stream, sequences of a private nature coming from a second stream received from another user).

According to another embodiment, it may on the contrary be a replacement by a part of a sequence having a different distribution characteristic (so as to obtain, for example, a filtering of certain sequences associated with a particular distribution characteristic, for example by replacing the private sequences of the stream by sequences of unrestricted distribution coming from other streams, when the optimized stream is intended for wide distribution, for example in a social network).

Certain embodiments, in which the video streams are transmitted continuously, and where the optimized video stream is generated "on the fly", enable the user to have an optimized stream available during the occurrence of the event.

According to the embodiments of the invention, the step of replacement is performed on streams pre-processed by acquisition terminals and especially sub-divided streams and/or is preceded by a step of sub-dividing, on the server, of at least one of the received streams.

According to one particular characteristic of the invention, said step of replacement is implemented periodically on said first stream.

Thus, the invention enables the reiteration, for a same stream acquired or being acquired, of the replacement of parts of a sequence by other parts so as to improve the optimizing of the generated streams.

In particular, in this embodiment, the period of replacement can be chosen so as to give preference to a speed of generation of the optimized video stream or a fluidity of the sequences or again so as to enable more numerous replacements in a sequence.

According to one particular characteristic of the invention, said step of replacement comprises a step for validating the replacement of said first part by said second part on the basis of a comparison of the content of said parts of sequences.

Thus, the method of the invention makes it possible to generate an optimized stream of an event, the optimizing being done not only in taking account of the distribution characteristics of the sequences of the stream acquired or being acquired by the terminal but also according to a comparison between a part of the acquired sequence and parts of a sequence coming from another video stream.

The comparison can especially take account of the quality of the parts of sequences (for example a sonic or visual noise level), or give preference to certain field widths or certain viewpoints or again streams received from certain particular devices, considered to be more adapted, for example a piece of professional equipment, while at the same time keeping unchanged the sequences of a personal nature (for example a close-up of friends or family of the terminal user, filmed by him).

According to one particular characteristic of the invention, said step of replacement comprises a step for homogenizing the encoding of said part of said second sequence with the encoding of said part of said first sequence.

Thus, the invention makes it possible to obtain a uniform encoding of the optimized stream so as to facilitate its subsequent use.

According to one particular characteristic of the invention, the method further comprises a step for distributing said optimized multimedia stream to at least one recipient terminal.

Thus the invention enables a third party to be provided with the optimized media stream and therefore, for example, with a stream of a quality higher than that of the acquired media stream, in doing so transparently for the third party.

According to another aspect, the invention pertains to a communications terminal comprising means for acquiring a multimedia stream pertaining to a real event, said terminal comprising:
  means for sub-dividing said stream into a plurality of consecutive sequences on the basis of at least one distribution characteristic, associated with each of said sequences;
  means for sending said plurality of sequences forming said multimedia stream.

The sub-dividing means of the terminal can be implemented in particular through of an application downloaded to the terminal, which preliminarily detects the start of the distribution of the stream being acquired or already acquired by the terminal. The means for sub-dividing can especially include means for automatically sub-dividing a stream during its acquisition and/or means for sub-dividing a stream during its acquisition at the operator's initiative.

According to yet another aspect, the invention pertains to a server for processing a multimedia stream pertaining to a real event, denoted as a first stream, said server comprising:

means for sub-dividing said first multimedia stream distributed by a communications terminal and received by said processing server, said first stream being sub-divided into a plurality of consecutive sequences, from at least one distribution characteristic associated with each of said sequences.

Such an embodiment offers the advantage of enabling a compatibility of the invention for the processing of streams acquired or received from the communications terminals not possessing their own means of sub-dividing.

Such a processing server also comprises:

means for replacing, in said first received stream, at least a part of a first sequence associated with a predetermined distribution characteristic by at least one part of a second sequence, of a second received stream, said second multimedia stream pertaining to said event and being distinct from said first stream, having a same temporal overlap as said part of said first sequence, said part of said second sequence being selected according to said predetermined distribution characteristic associated with said first sequence, generating an optimized multimedia stream.

Depending on the embodiments of the invention, the means may be means implemented through an application situated on the server or means activated by an operator.

The processing server of the invention can also comprise means for implementing the method for processing described here above, in any one of its different embodiments.

According to another aspect, the invention pertains to a computer program product comprising program code instructions for implementing the above-mentioned method (in any one of its different embodiments) when said program is executed by a processor.

4. LIST OF FIGURES

Other features and advantages of the invention shall appear more clearly from the following description of a particular embodiment, given by way of a simple illustrative and non-exhaustive example, and from the appended drawings of which.

5. DESCRIPTION OF ONE EMBODIMENT OF THE INVENTION

5.1 General Principle

Figure 1A:
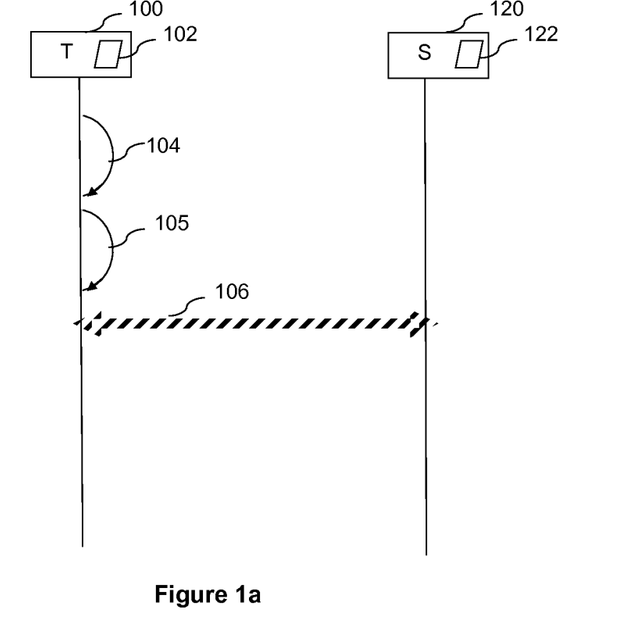
FIGS. 1a and 1b present a drawing of the principle of the invention, in two separate and possibly complementary embodiments.
Figure 1B:
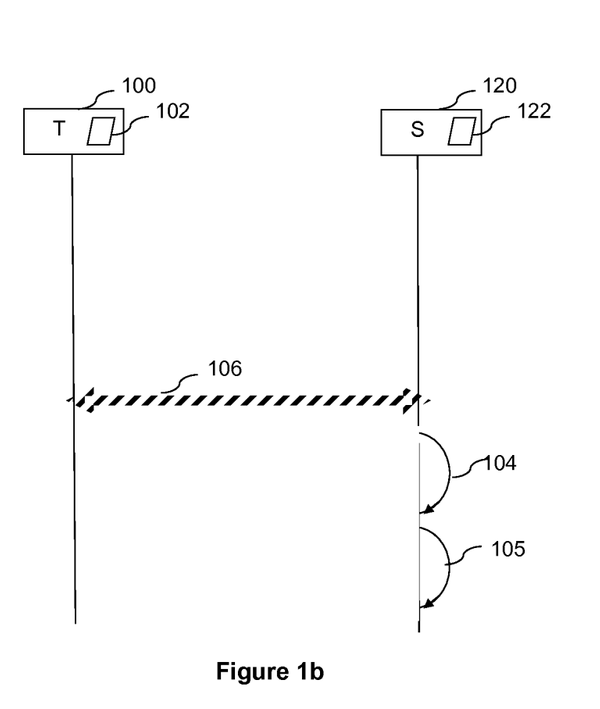

FIGS. 1a and 1b present the general principle of the invention, in two possibly complementary embodiments.

The invention seeks to enable a user generating a video pertaining to a topical event that he witnesses, such as a show (a concert in particular), for example in order to distribute it to one of his correspondents (friend, family, etc), to obtain a video of better quality than the one that he initially obtained on his own, enabling him to benefit transparently from the viewpoints and angles of view of the same show acquired by various other spectators, while at the same time preserving the personal aspect of his distribution.

Indeed, it is very frequent for numerous spectators to film the same scene at the same time from different positions. A group of spectators, where each spectator carries out retransmission separately, therefore potentially and taken as a whole, at least in terms of the diversity of viewpoints, possesses the same technical capacities as a professional operator filming such an event by means of several video acquisition terminals.

More specifically, the principle of the invention consists of the detection, for example by means of a dedicated application 102 preliminarily downloaded on a communications terminal 100, of the start of the distribution, by the terminal 100, of a multimedia stream that has been acquired or is being acquired by this terminal, and that pertains to a particular event, and of the sub-dividing of this stream into consecutive sequences, according to at least one distribution characteristic associated with each of the sequences, which will then be optimized.

The invention especially makes it possible, through this distribution characteristic, to distinguish the sequences of a personal nature from other sequences called sequences of a public nature.

The distribution characteristic associated with a sequence (for example a characteristic of being of a private or public nature) can be defined especially on the basis of information such as a characteristic of a means of acquisition of the sequence (front-vision or rear-vision camera of the mobile terminal), for example its position, resolution or its orientation, a geolocation of the communications terminal relative to the place of occurrence of the event (a scene of a show for example), a characteristic pertaining to the content of the video sequence (face detection and/or face recognition, detection and/or recognition of predefined elements), an angle of view, an order of association of an operator etc.

Thus, the distribution characteristic of a sequence can be defined from the context of the capture of the video sequence or be linked to the content of the video sequence.

Thus, in one particular embodiment of the invention, the sequence in which the focus is on a face, supposed to be a face of a friend or family member, can be considered to be a sequence of a private nature. Such a focus can for example be detected by a software component of the application (102, 122) in charge of face recognition.

Similarly, the presence in the sequence of predetermined elements relative to the event, such as for example a marker on the scene of a show type event, or again a known scenery of a sea race type event, or a pre-recorded face such as that of an actor of the event, could indicate the "public" nature of the sequence. Other elements, predefined by the user of the terminal (for example an image of the face of a friend or family member) can on the contrary enable a decision on the "private" nature of a sequence.

Finally, in yet other embodiments, possibly complementary embodiments, the definition of the distribution characteristic associated with a sequence can be done manually by the user, so that, for example, the distribution of certain scenes, including significant persons related to the event, is not restricted to a private context.

In certain embodiments, a pre-processing of the stream to be optimized is done by the terminal before the processing and optimizing of the stream on a remote server.

Thus, in the embodiment illustrated in FIG. 1a, the detection step 104 is implemented by the terminal 100, for example by means of a dedicated application 102 preliminarily installed on the terminal, for example by downloading. This application can also take charge of the step 105 for sub-dividing the stream into sequences before sending (step 106) these sequences to a dedicated application 122, situated on a remote server 120. This server 120 then takes charge of the generation of an optimized stream, as described in greater detail here below.

Such an embodiment, in which the sub-dividing step 105 is implemented on the terminal, can make it possible to deduce distribution characteristics from the state or use of certain means of characterization of the terminal at the time of the acquisition.

Thus, in certain embodiments, the use of a front-vision camera could be considered by default to be the sign of private distribution, without analysis of the content of the associated sequence, and the change of camera, for acquisition by a rear-vision camera of the terminal, will mark the start of a new sequence for which the distribution characteristic, in principle of a public nature, could be determined/confirmed for example by an examination of its content.

Similarly, the use of a compass and/or a gyroscope of the terminal 100 can make it possible to detect an orientation of a viewfinder of a camera toward the scene of an event and therefore to associate a characteristic of a public nature with the corresponding sequence, without necessarily analyzing the content of the sequence.

The operation can also take account of the viewpoint, i.e. the precise geolocation of the terminal (and therefore of its user) during the shooting, and of its variations according to time if the terminal 100 is in motion, and the direction of recording by the terminal 100.

In other embodiments, as illustrated in FIG. 1b, the sub-dividing step 105 can be performed entirely by the dedicated application 122 situated on the remote server 120. In this case, the dedicated application 102 installed preliminarily on the terminal 100 detects the start of distribution of the stream and sends it (step 106) without sub-division, toward the dedicated application situated on the remote server 120. The remote server 120, in turn, during a detection step 104, detects the start of distribution of the stream and implements the step 105 for sub-dividing the stream into sequences.

Such an embodiment is particularly suited to sub-dividing into sequences in which the distribution characteristics are deduced from the presence, in the sequences, of predetermined elements pertaining to the event.

In this case, the step 106 for sending the stream can comprise a step for sending complementary information on distribution characteristics, for example information on an angle of view, to the camera used (if the terminal has several cameras available (for example a front-vision camera and a rear-vision camera), a fine geolocation of the user, etc.

In certain embodiments of the invention, these pieces of complementary information can be sent in parallel to the sending of the stream. In this case, the pieces of complementary information sent are synchronized temporally with the stream sent so that they can be indexed temporally with the stream.

In other embodiments, the pieces of complementary information can be sent during the sending of the stream, especially through the insertion and/or the positioning of signaling elements of the stream sent (for example by means of an orthogonal encoding).

In yet other embodiments of the invention, the sub-dividing step 105 can be implemented successively by the dedicated application 102 installed on the terminal, and then by the dedicated application 122 situated on the remote server 120. These embodiments make use of the capacities for determining a distribution characteristic of both the terminal and the server.

In certain embodiments, especially when the sub-dividing step is performed on the terminal, the step 106 for sending the stream can be constituted by a plurality of sending sub-steps, each comprising the sending of a sequence and of the associated distribution characteristic, or it can comprise a sub-step for reassembling the sub-divided stream into sequences and a step for sending the reassembled stream. In this case, each of the reassembled sequences can have a time-stamped marker associated with it, enabling the server at reception to identify the different sequences. The markers and the distribution characteristics associated with a sequence can be inserted into the stream or forwarded separately to the stream.

5.2. Presentation of a Particular Embodiment of the Invention

Figure 2:
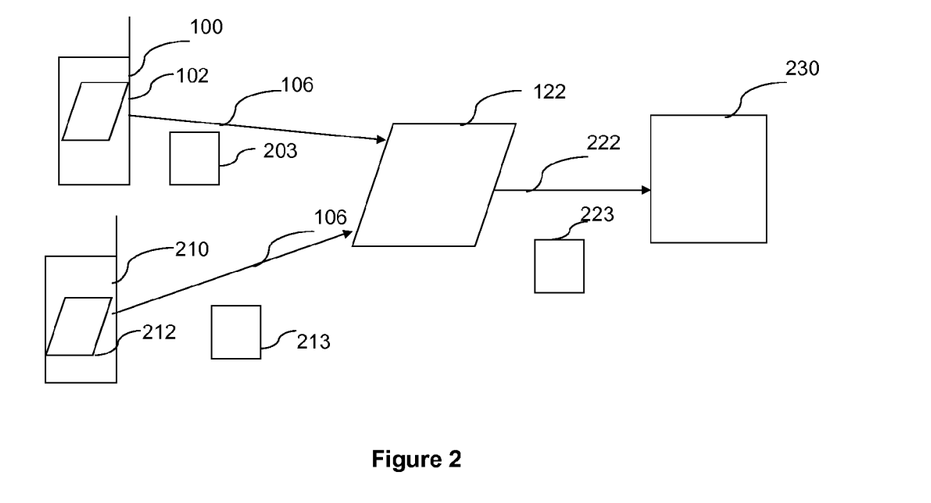
FIG. 2 illustrates one particular embodiment of the invention.

In the particular embodiment illustrated in FIG. 2, the multimedia/video stream acquired from a terminal 100 and then detected and sub-divided by an application 102 installed on the terminal 100 is sent, at a sending step 106, to a dedicated application 122 situated on a remote server.

This server, in its turn, detects the start of distribution of the multimedia streams (203, 213) and ensures the setting up of the multimedia contents (203, 213) coming from several terminals (100, 210) to generate an optimized multimedia content 223, for example of better quality, comprising sequences coming from either of the multimedia streams (203, 213), certain sequences of a first multimedia stream 203 being replaced at least partially by parts of sequences of a second multimedia stream 213.

The optimized stream 223 thus obtained can then be sent (step 222) to another terminal 230. It can be one of the terminals having generated one of the video streams, when its user wishes to have an optimized stream available for his own use, or it can be a third-party terminal, for example a recipient terminal designated by a user of the first terminal 100.

The terminals (100, 210) can consist for example of a mobile terminal, for example a telephone terminal comprising means for acquiring a video stream, especially a tablet (especially when the sub-dividing step 105 is implemented on the terminal itself), or a video camera, and provided with means of communication with a communications network, for example a 3G mobile access to a mobile network. Thus, the method of the invention enables a user who does not possess any specific competence in the field of video to propose an optimized higher-quality retransmission of an event.

In addition, by replacing certain parts of the stream acquired by a terminal with high-quality parts, the method of the invention enables the user of a terminal having mediocre video capacity to benefit from the video capacities of better-performing terminals belonging to other users.

In certain embodiments, the method of the invention also enables a user to preserve the personal character of his retransmission, since only the public sequences of his own distribution will be pooled.

According to certain embodiments, the method of the invention also enables each user filming a current event to automatically obtain multiple coverage, in terms of viewpoints, of the event.

According to yet another particular embodiment, the method of the invention enables the limiting, in certain cases, of the mass of video streams distributed for an event and thus prevents the saturation of the communications network used, in offering several users the possibility of distributing a same optimized stream. For example, certain users, whose video comprises only sequences of a public nature, can share the same optimized stream, thus limiting the number of streams effectively distributed for a same event. Thus, for example, instead of distributing ten different streams pertaining to a same event, the method in certain particular embodiments of the invention enables the distribution of only five distinct optimized streams.

Besides, it must be noted that the method according to the different embodiments of the invention offers a solution of implementation that is simple for the user and, at least in certain embodiments, proposes a profitable economic model to the organizers of an event.

5.3. Description of the Dynamic Operation of the Method of the Invention in One Particular Embodiment Referring to FIG. 3, a description is now provided of the steps of the method of the invention according to one particular embodiment, compatible with the embodiment presented in FIG. 2. In the embodiment presented in FIG. 3, the method is implemented for the video coverage of a concert.

Figure 3:
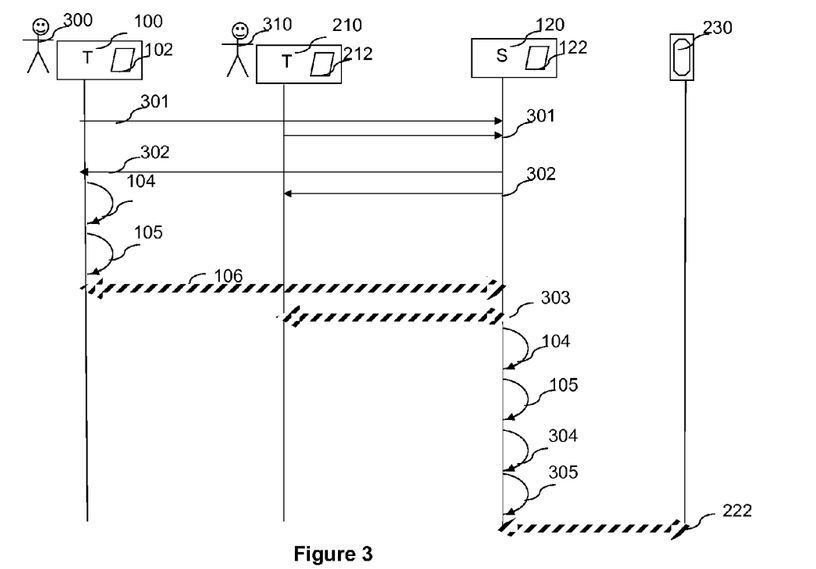
FIG. 3 illustrates the dynamic operation of the method of the invention in one embodiment compatible with the embodiment presented in FIG. 2.

The method comprises, prior to the concert, a step for identifying the event constituted by the concert, by means of the application 122 executed on a server 120 according to the invention. This step for identifying, initiated for example by the organizer of the concert, comprises especially the obtaining of the date and time of the start and end of the concert, and its geographical location. It can also comprise the obtaining of other pieces of information such as a nature of the event (solo or group concert, current event, street show, lecture, land or sea race, air show, etc.), a radius or the coordinates of a geographic coverage area (corresponding for example to the size of the room in which the concert is taking place, to a distance relative to a recorded itinerary, for example to the itinerary planned for a land or sea race). Such pieces of information make it possible especially to distinguish a first event from a second event that is temporally and/or geographically proximate.

In the embodiment illustrated, the method also comprises a step for taking account 301 of a registration of the terminal 100 of the user 300 wishing to generate a video stream pertaining to the concert.

This registration can be done by geolocation for any terminal (100, 210) entering the area of geographical coverage assigned to the event, in a time frame close to the time frame allotted to an event, automatically or after interrogation of the terminal (100, 210) by the application 122. The downloading of a dedicated application (102, 212) whose purpose is to dialog with the application 122 situated on the server 120, for example an application available in an electronic catalog such as "Android Market" (registered mark) or Apple Store (registered mark) may in particular be proposed to the user (300, 310) of the terminal (100, 210) during this interrogation.

It can also be a registration done by the terminal (100, 210) itself, at the initiative of the user (300, 310) or at the initiative of a dedicated application executed on the terminal (100, 210), for example an application downloaded beforehand on the terminal. Such an application can especially store the events for which a terminal is registered.

In other embodiments of the invention, the registration of a terminal can be done, not at the time of the event, but prior to the event, for example through an dedicated Internet service or a dedicated mobile application. Thus, the registration of the terminal (100, 210) can advantageously be done during the registration (online or on paper) of the user (300, 310) of the terminal (100, 210) for the event. For example, during the online purchase of a ticket for the show concerned, a software component may ask the user for the number of his mobile telephone, in specifying that this will enable him to access the service. As a variant, this complementary registration can be a chargeable option.

In the embodiment presented in FIG. 3, an application 102 is downloaded by the user 300 during his registration.

In the embodiment illustrated, the method furthermore comprises, during the registration of a terminal (100, 210), the step of temporal synchronization 302 of the terminal (100, 210) with a temporal reference source, for example a clock internal to the server 120. In other embodiments, this synchronization step can be done, for all the registered terminals, just before the start of the identified event.

In addition, the method comprises a step for detecting 104 the start of distribution of a multimedia stream from the terminal (100, 210). In the embodiment illustrated, the dedicated application (102, 212) is activated automatically during the event, for example at the date and time of the start of the event and/or when the location of the terminal (100, 210) is situated in the geographical perimeter of the event, so that it goes into a state of standby pending the start of the distribution of a stream by the terminal.

In one variant of the invention, the application can be activated slightly before or after the start of the event, for example according to a predefined time margin, in order to take account of possible delays, which are frequent in most events, or on the contrary to have available a safety time margin.

In certain particular embodiments, this time margin and the geographical perimeter of the event can be defined by default, or according to the nature of the events, for example depending on whether it is a show or a retransmission of a sea or land race or a aerial ballet. In other embodiments, these values can also be particular to an event and defined, for example, by the organizer of the event.

According to the invention, the method also comprises a step for sub-dividing 105 the stream pertaining to the event, implemented during or after the acquisition of the stream by the terminal 100, in consecutive sequences, each associated with at least one distribution characteristic. As explained with reference to FIGS. 1a and 1b, this step of sub-dividing can be performed by the application 102 situated on the terminal 100 or by the application 122 situated on the server 120.

In certain embodiments, the method also comprises a step for the receiving 303, by the dedicated application 122 situated on the server 120, of at least one second multimedia stream relating to said event and distinct from the first stream. This second multimedia stream can for example come from a second also registered terminal 300.

In particular, the method can further comprise a step 304 of identification, for the first and second streams, of a plurality of consecutive sequences, from at least one distribution characteristic, associated with each of the sequences.

In the embodiment presented, the step 304 for identifying comprises in particular a step of temporal calibration of each sequence relative to the instants of acquisition, determining in particular the instants of starting and ending the acquisition of each sequence.

In certain embodiments, the method also comprises a step of replacement 305, in the first stream, of at least one part of a first sequence, associated with a predetermined distribution characteristic, by at least one part of a second sequence of the second stream received, of the same time frame as the first part, the second part being selected according to the predetermined distribution characteristic, generating an optimized multimedia stream.

According to the embodiments of the invention, the step of replacement 305 can be implemented by an operator, for example on-the-fly, or automatically by the application 122 being executed on the server 120.

In particular, in at least one embodiment of the invention, the temporal synchronization of the acquisition terminals for acquiring the first stream and/or the second stream, prior to the step for detecting the start of the distribution of the streams, and the temporal calibration of each sequence make it possible to take account of only parts of sequences corresponding to a same time frame of acquisition, the sequences pertaining to streams received with a delay being not taken into consideration by the application 122 during the replacement step 305.

During the replacement step 305, the replacement of the first part of a sequence of a first stream is done conditionally, when the distribution characteristic of the sequence is equal to a predetermined characteristic.

In certain particular embodiments, the replacement can be especially the replacement of sequences of a private nature by sequences of a public nature, in order to obtain a stream formed entirely by sequences of a public nature, that can be distributed to any third party or third parties whatsoever.

In one variant, such embodiments may comprise a step for blurring or opacifying certain elements of a sequence considered to be public, for example a face or an advertising sign present in a sequence considered to be public, owing especially to a position of the camera of the acquisition terminal.

In certain embodiments, the step of replacement 305 can comprise a step for validating the replacement of a first part of a sequence by a second part of a sequence, on the basis of a comparison of the contents of the two parts of the sequences.

This comparison can for example take account of the quality of definition of each of the parts of the sequences, an estimation of a level of visual or sonic noise, the equipment of acquisition of the multimedia streams or a criterion of maximization or, on the contrary, of limitation of the divergence between the different viewpoints used successfully by a sequence.

Thus, the viewpoint (i.e. the fine geolocation) of the terminal can vary with time, during the acquisition of the stream. One of the criteria of validation of the replacement can be that of maximizing the distance between the viewpoints associated with the different sequences forming the optimized stream, during the combination of the videos.

If, for example, ten registered terminals are geolocated at different viewpoints relatively to the scene of the show, and if the duration of the event and the predefined minimum duration of viewing of the sequence (see here below) enable only three successive replacements, the comparison can be based on the distance between the different viewpoints, so as to avoid keeping only sequences coming from three users who are very close to each other (this could happen through an independent choice of viewpoints).

Another criterion can consist in replacing a part of a sequence only by a part of a sequence having a divergence of viewpoints that is limited relative to the first sequence so as to produce a stream that is visually comfortable during its distribution.

Besides, in certain possibly complementary embodiments, the comparison also takes account of the exact geolocation of an event (a scene for example) according to the respective position of the terminals relative to the scene (and not only according to the distance between the terminals), for example so as not to use any sequence coming from a terminal that is badly positioned relative to the scene (for example situated on the side of the scene or far too distant from the scene). In particular, boundary values of the positioning of a terminal, predefined at the time of the identification of the event, can be used to "filter" the sequences.

It can also be chosen to avoid replacing parts of sequences of the first stream by streams of lower quality and definition or streams that are weaker, according to predefined scales. It is possible, on the contrary, to replace lower-quality and/or lower-definition sequences of the first stream by higher-quality and/or higher-definition sequences from other streams.

The step for validating the replacement can also take account of other criteria, such as for example a minimum duration of viewing of a sequence (for example of the order of a few seconds) before it can be replaced in part. This minimum duration makes it possible to preserve a natural and fluid character for the optimized stream, especially when the replacement step 305 is implemented by an operator.

The step for validating the replacement can also give preference to those parts of sequences received from a professional device, provided in particular for example by an organizer of the event. Such an embodiment makes it possible especially to mix professional shots, for example close-ups of a scene or of a show, with those of spectators.

Finally, according to one variant of the invention, for example when the registration with the processing service is offered free of charge to the user, the step of replacement 305 can include the replacing of certain sequences by advertising sequences.

In certain particular embodiments, the step of replacement 305 is implemented periodically on the first stream. The period of replacement can especially be defined so as to take account of a minimum duration of viewing, without replacement, of a sequence or part of a sequence, for fluidity of viewing of the stream.

In other particular embodiments of the invention, possibly complementary to the above-mentioned embodiments, the step of replacement can comprise a step for homogenizing the encoding of the two parts of sequences, implemented before the substitution of the parts of sequences. It can also include, in this case, a step for re-encoding the optimized stream so that the optimized stream possesses the same encoding as the first stream.

In the embodiment illustrated in FIG. 3, the method furthermore comprises a step for distributing 222 the optimized multimedia stream, obtained during the step of replacement, towards at least one recipient terminal 230. This recipient terminal can especially have been determined, during the step 104 for detecting a start of distribution of a video stream, for example by the application 102 installed on the terminal 100.

According to one variant of the invention, the method can be used to optimize not a stream being acquired but a stream already acquired by a terminal, for example a video document such as a video MMS or another attached document addressed by the user of the acquisition terminal to a third party.

Figure 4:
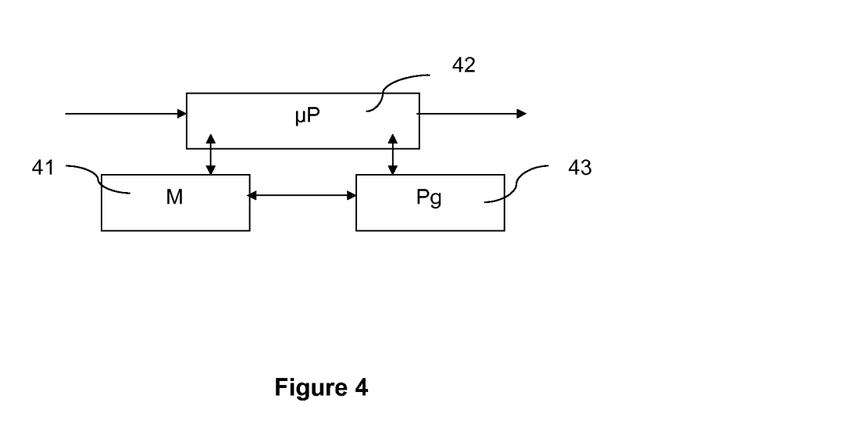
FIG. 4 describes an example of a terminal of the communications network according to the invention.

5.4 Structure of a Communications Terminal Adapted to the Implementing of the Method for Processing, According to the Invention Referring now to FIG. 4, we present the simplified structure of a communications terminal, connectable to a communications network.

Such a terminal comprises a memory 41 comprising a buffer memory, a processing unit 42 equipped for example with a microprocessor µP, and driven by a computer program 43, the execution of which implements a method for processing according to the invention.

At initialization, the code instructions of the computer program 43 are loaded for example into a RAM and then executed by the processor of the processing unit 42.

The microprocessor of the processing unit 42 implements the steps of the method for processing described here above, according to the instructions of the computer program 43.

The communications terminal thus comprises, in addition to the buffer memory 41:
- means for acquiring a multimedia stream pertaining to a real event,
- means for sub-dividing the stream into a plurality of consecutive sequences, on the basis of at least one distribution characteristic, associated with each of said sequences;
- means for sending said plurality of sequences forming said multimedia stream.

These means are driven by the microprocessor of the processing unit 42.

Figure 5:
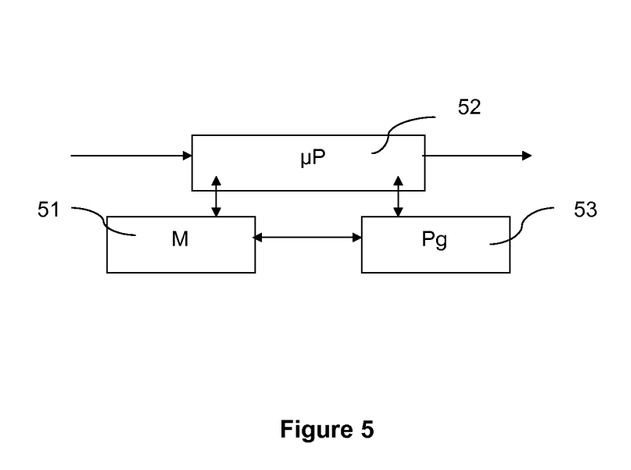
FIG. 5 describes an example of a server of the communications network according to the invention.

5.5 Structure of a Communications Server, Adapted to the Implementing of the Method for Processing, According to the Invention Referring now to FIG. 5, we present the simplified structure of a communications server, connectable to a communications network.

Such a terminal comprises a memory 51 comprising a buffer memory, a processing unit 52 equipped for example with a microprocessor µP, and driven by a computer program 53, the execution of which implements a method for processing according to the invention.

At initialization, the code instructions of the computer program 53 are loaded for example into a RAM and then executed by the processor of the processing unit 52.

The microprocessor of the processing unit 52 implements the steps of the method for processing described here above, according to the instructions of the computer program 53.

The communications terminal thus comprises, in addition to the buffer memory 51, means for:
- receiving a first multimedia stream pertaining to a real event, denoted as a first stream, distributed by a communications terminal:
- sub-dividing the first multimedia stream, the first stream being sub-divided into a plurality of consecutive sequences, on the basis of at least one distribution characteristic, associated with each of said sequences.

These means are driven by the microprocessor of the processing unit 52.

In certain embodiments, the server can also comprise additional means for:
- replacing, in the received stream, at least a part of a first sequence associated with a predetermined distribution characteristic by at least one part of a second sequence, of a second received stream, the second multimedia stream pertaining to the event and being distinct from the first stream, having a same temporal overlap as the part of the first sequence, the part of the second sequence being selected according to the predetermined distribution characteristic, generating an optimized multimedia stream.

The invention claimed is:

1. A method for processing at least one multimedia stream pertaining to a real event, which is being acquired or has been acquired by a communications terminal, denoted as a first stream, wherein said method comprises the following steps:
   sub-dividing said first stream into a plurality of consecutive sequences, on the basis of at least one distribution characteristic associated with each of said sequences, said sub-dividing being activated by distribution of said first stream by said communications terminal and
   replacement, in said first stream, of at least one part of a first sequence associated with a predetermined distribution characteristic by at least one part of a second sequence, identified from at least one distribution characteristic, of at least one second multimedia stream pertaining to said event, said second stream being distinct from said first stream, said part of said second sequence being of a same time frame as said part of said first sequence, said second part being selected according to said predetermined distribution characteristic associated with said first sequence, generating an optimized multimedia stream.

2. The method for processing according to claim 1, wherein said distribution characteristic associated with a sequence is defined on the basis of elements of information belonging to the group consisting of:
   a shooting parameter;
   a parameter of confidentiality depending on a recognition of objects in the sequence;
   a geolocation of said terminal and/or a place of occurrence of said event;
   an order of association of an operator.

3. The method for processing according to claim 1, wherein said method further comprises a preliminary step of identifying said event delivering a piece of information for identifying said event comprising at least one temporal and geographical demarcation of said event.

4. The method for processing according to claim 1, wherein said method comprises a preliminary step of taking account of a registration of said terminal.

5. The method for processing according to claim 4, wherein said registration of said terminal comprises at least one piece of information for identifying an event.

6. The method for processing according to claim 1, wherein said method comprises a step of temporal synchronization of said first stream with a reference time base.

7. The method for processing according to claim 1, wherein said step of replacement is implemented periodically on said first stream.

8. The method for processing according to claim 1, wherein said step of replacement comprises a step of validating the replacement of said first part by said second part according to a comparison of the content of said parts of sequences.

9. The method for processing according to claim 1, wherein said step of replacement comprises a step of homogenizing an encoding of said part of said second sequence with an encoding of said part of said first sequence.

10. The method for processing according to claim 1, wherein said method further comprises a step of distributing said optimized multimedia stream to at least one recipient terminal.

11. A processing server for processing a multimedia stream pertaining to a real event, denoted as a first stream, wherein said server comprises:
- means for sub-dividing said first multimedia stream distributed by a communications terminal and received by said processing server, said first stream being sub-divided into a plurality of consecutive sequences, on the basis of at least one distribution characteristic, associated with each of said sequences; and
- means for replacing, in said first received stream, at least a part of a first sequence associated with a predetermined distribution characteristic by at least one part of a second sequence, of a second received stream, said second multimedia stream pertaining to said event and being distinct from said first stream, having a same temporal overlap as said part of said first sequence, said part of said second sequence being selected according to said predetermined distribution characteristic, generating an optimized multimedia stream.

12. A non-transitory memory storing a program which, when executed by a computer or a processor, causes the computer or the processor to carry out a method for processing at least one multimedia stream pertaining to a real event, which is being acquired or has been acquired by a communications terminal, denoted as a first stream, wherein said method comprises the following steps:
- sub-dividing said first stream into a plurality of consecutive sequences, on the basis of at least one distribution characteristic associated with each of said sequences, said sub-dividing being activated by a distribution of said first stream by said communications terminal; and
- replacement, in said first stream, of at least one part of a first sequence associated with a predetermined distribution characteristic by at least one part of a second sequence, identified from at least one distribution characteristic, of at least one second multimedia stream pertaining to said event, said second stream being distinct from said first stream, said part of said second sequence being of a same time frame as said part of said first sequence, said second part being selected according to said predetermined distribution characteristic associated with said first sequence, generating an optimized multimedia stream.

* * * * *